US006400469B1

United States Patent
Saito

(10) Patent No.: US 6,400,469 B1
(45) Date of Patent: Jun. 4, 2002

(54) PRINTING APPARATUS FOR COLOR ELECTRONIC PHOTOGRAPH

(75) Inventor: Takashi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/224,946

(22) Filed: Jan. 4, 1999

(30) Foreign Application Priority Data

Jan. 9, 1998 (JP) .......................................... 10-014783

(51) Int. Cl.$^7$ ................................................ G03F 3/08
(52) U.S. Cl. ........................................ 358/1.9; 358/527
(58) Field of Search ........................ 358/1.9, 500, 521, 358/527; 382/162–167

(56) References Cited

U.S. PATENT DOCUMENTS

| 4,641,267 A | * | 2/1987 | Asai et al. ................... 364/414 |
| 4,893,180 A | * | 1/1990 | Shigaki et al. ................ 358/80 |
| 5,123,060 A | * | 6/1992 | Cho et al. ..................... 382/51 |
| 6,061,091 A | * | 5/2000 | Van de Poel et al. ....... 348/241 |
| 6,115,150 A | * | 9/2000 | Nakamura et al. .......... 358/521 |
| 6,118,895 A | * | 9/2000 | Hirota et al. ............... 382/165 |

FOREIGN PATENT DOCUMENTS

| JP | 1-146769 | 6/1989 |
| JP | 1-196347 | 8/1989 |
| JP | 1-316762 | 12/1989 |
| JP | 3-162976 | 7/1991 |
| JP | 8-181863 | 7/1996 |
| JP | 9-224154 | 8/1997 |

* cited by examiner

Primary Examiner—Thomas D. Lee
Assistant Examiner—Stephen Brinich
(74) Attorney, Agent, or Firm—Foley & Lardner

(57) ABSTRACT

To provide a color printing apparatus which is freed of a problem such that, if gradation conversion processing of picture data is to be implemented by hardware, the number of the registers is prohibitively increased to increase the cost if the gradation curve information required for gradation conversion processing is to be stored in its entirety in the registers. The printing apparatus includes a basic gradation curve register for storage of the basic gradation curve information and a shifting quantity register for storing the shifting quantity information. The values of the information data are calculated by the gradation curve calculation circuit to generate the gradation curve information which is stored in gradation curve information registers. The color picture data entered to the apparatus are gradation-converted, based on the gradation curve information, and are transferred to an engine part in the apparatus to output a picture.

15 Claims, 4 Drawing Sheets

PRINTING APPARATUS FOR COLOR ELECTRONIC PHOTOGRAPH

FIELD OF THE INVENTION

This invention relates to a printing apparatus for color electronic photographs and, more particularly, to a circuit in a printing apparatus for color electronic photographs for calculating laser intensity output to an engine part in the apparatus in which the number of registers required for representing the gradation curve is diminished to reduce the circuit size.

BACKGROUND OF THE INVENTION

Heretofore, if a color picture is entered or output in the printing apparatus for color electronic photographs, the number of gradations per dot of input picture data needs to be converted into a number of gradations that can be represented by an engine portion prior to representation thereof. It is indispensable as the performance of a printing apparatus for the gradation of an output color picture in its entirety to maintain the gradation of the input picture.

Thus, picture processing termed half-tone processing is routinely performed. In this half-tone processing, the cell-to-cell angle (screen angle E) and the cell-to-cell distance (frequency, lines per inch) are adjusted depending on output engine characteristics, with a half-tone cell as a collection of a dot for representation as a unit. In the cell, the representing laser intensity is processed with gradation conversion by a pre-set gradation curve proper to the apparatus from dot to dot to give output data.

This processing, implemented in general by a printer description language in software, is not explained herein as to its detailed operation or processing. As an apparatus for generating a correction gradation curve for correcting gradation conversion characteristics of a reference gradation curve in order to effectuate radiation conversion for matching the gradation of picture data to the concentration gradation of a recording picture of a transcription paper sheet output by a printer on the basis of picture data obtained on reading an original picture having gradation characteristics, reference is made to the JP Patent Kokai JP-A-8-181863. There is also disclosed in JP Patent Kokai JP-A-9-224154 a picture data processing apparatus including first storage means for storage of an output gradation reference curve, a second storage unit for storing plural normalized gradation change curves, selection means for selecting one of the plural normalized gradation change curves, and calculation means for changing the output gradation curve based on a gradation change curve selected by the selection means to find values on an output gradation curve to be formulated by such change, as output picture data, in order to reduce the quantity of the information to be stored in the storage means and the capacity of the storage means.

SUMMARY OF THE DISCLOSURE

If the halftone processing is to be implemented by hardware, there is required a register for holding the gradation curve information for converting the input data gradation into output data gradation in each of dots in the half-tone cell.

Assume that the number of dots making up a half-tone cell is D, the number of input gradation bits is KI and the number of output gradation is KO, the number of these registers is $$D \times KI \times KO \text{ (bits)}.$$

The result is that the more the number of input and output gradations for realization of variegated color representation, the more is the number of required registers, thus directly leading to an increased hardware cost.

Moreover, if the number of registers is increased, the time required for setting values in the registers is increased to lower the printing performance of the printing apparatus itself.

In view of the above problems, it is a principal object of the present invention to provide a color laser printing apparatus having the function of realizing half-tone processing by the hardware such as to evade cost rise or lowered performance.

According to a first aspect of the present invention, there is provided a novel printing apparatus for color electronic photographs aimed at accomplishing the above object. The printing apparatus generates the gradation curve information by calculation of basic gradation curve data and shifting quantity data used for shifting the basic gradation curve data to effect gradation conversion processing of picture data, to reduce the number of registers required for representing a gradation curve.

According to a second aspect, specifically, the printing apparatus for color electronic photographs has a function of inputting gradation data of plural bits concerning representation of a dot, a function of comparing input gradation data to a pre-formulated gradation table to effect gradation conversion and a structure for implementing these functions by a hardware. The printing apparatus includes (a) a set of registers capable of holding, as data, the gradation curve information necessary for gradation conversion which determines data (i.e., data of laser intensity or radiation time) desired to be output depending on values of input gradation data, (b) a gradation curve calculating circuit which finds the gradation curve information to be held on said set of registers based on calculation, and (c) a basic gradation curve register and a shifting quantity register, as a picture processing circuit. The basic gradation curve register holds basic gradation curve data entered to the gradation curve calculating circuit, while the shifting quantity register holds shifting quantity data which is the amount of shifting of said basic gradation curve data.

The calculation is typically based on addition of two systems of input data. The term "shifting" is generally understood as parallel shifting. The shift quantity (or amount of shift) is an addend to be used for the calculation to provide a parallel shifting of the basic gradation curve defined by the basic gradation curve data.

PREFERRED EMBODIMENTS

An embodiment carrying out the present invention will be hereinafter explained. The picture processing apparatus has a hardware circuit for half-tone processing an input picture. This hardware circuit includes a gradation curve calculation unit (4 of FIG. 2) for generating the gradation curve information of reference by calculations, a basic gradation curve storage unit (1 of FIG. 2) for storing the information on the basic gradation curve required for the calculations; and a shifting quantity storage unit (2 of FIG. 2) for storing the shifting quantity information for shifting calculations of the basic gradation curve by the gradation curve calculation means. The basic gradation curve information and the shifting quantity information are set in registers, respectively, so that the gradation curve calculating unit (circuit) generates the gradation curve information required for half tone processing. By having reference to this gradation curve information, the input gradation data is processed by the calculating unit with gradation conversion processing to generate output gradation data which is output.

The above objects, features, operation and result will become apparent from the following description of the embodiment of the present invention.

PREFERRED EMBODIMENT OF THE INVENTION

Figure 4:
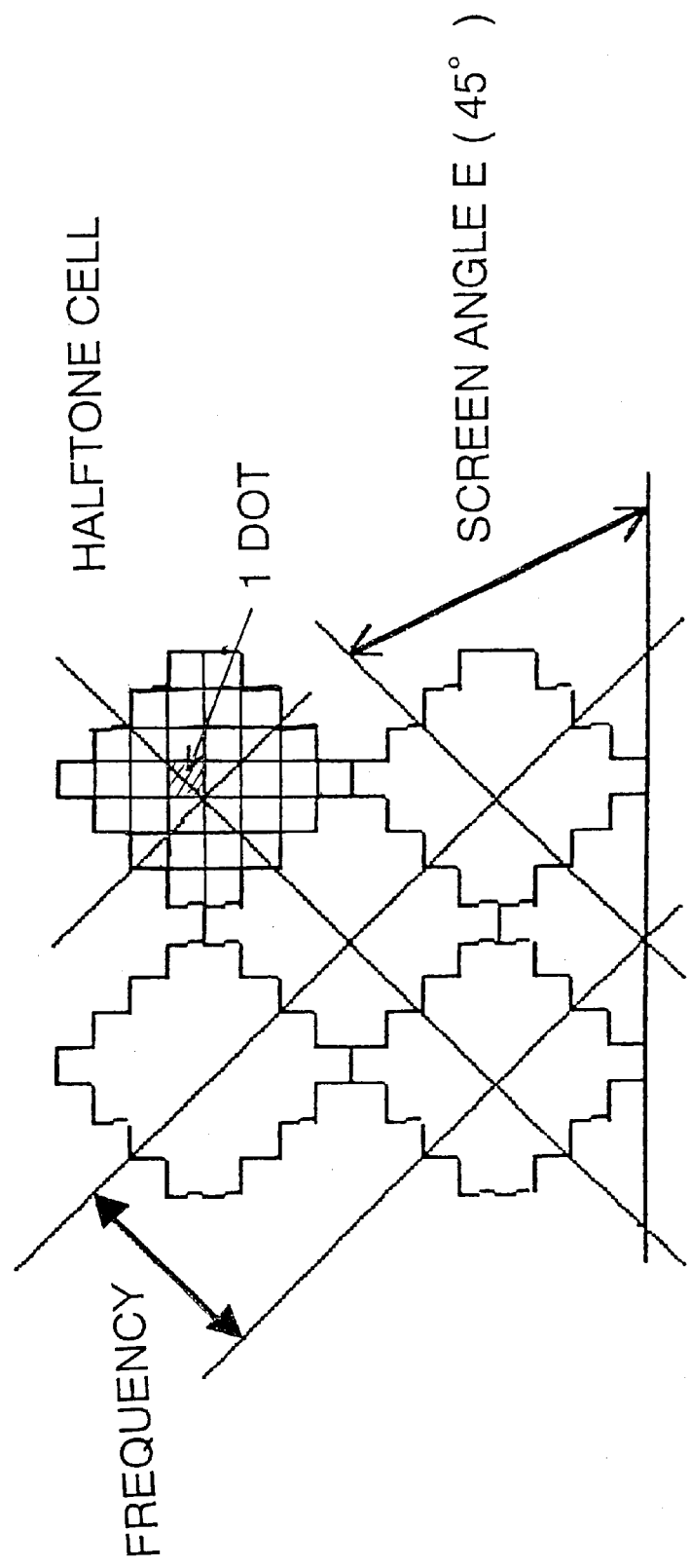
FIG. 4 illustrates the concept of the half tone cell structure by way of an example.

Generally, the half tone processing is performed based on dividing the entire picture into a plurality of half tone cells having certain cell structure as shown in FIG. 4 by way of an example. The individual half tone cell is made up of a plurality of dots each specified by a specific gradation curve. By shifting a basic gradation curve, a variety of gradation curves are obtained, providing finer half tone gradation grades.

Figure 1:
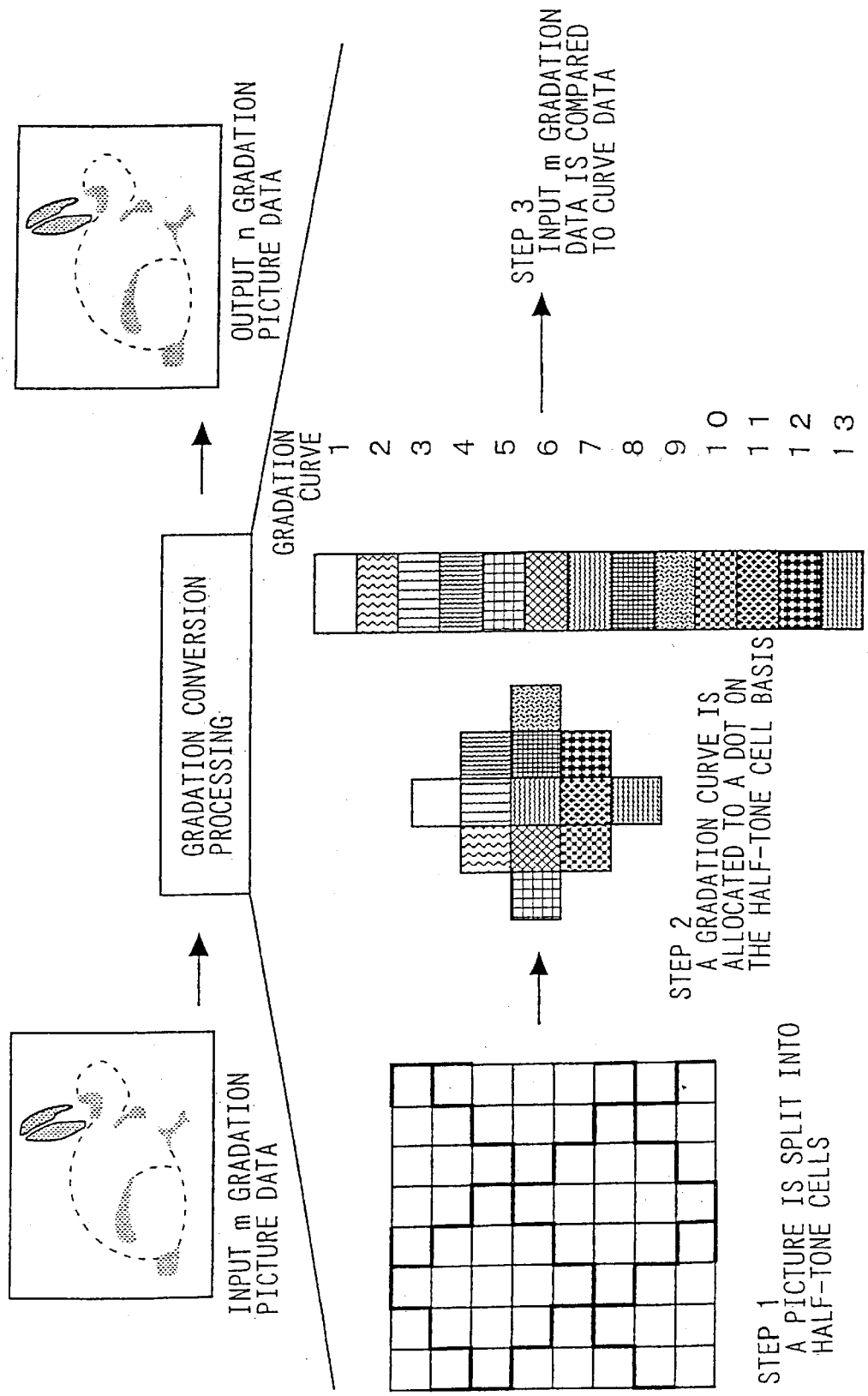
FIG. 1 illustrates schematics of halftone processing according to an embodiment of the present invention.
Figure 2:
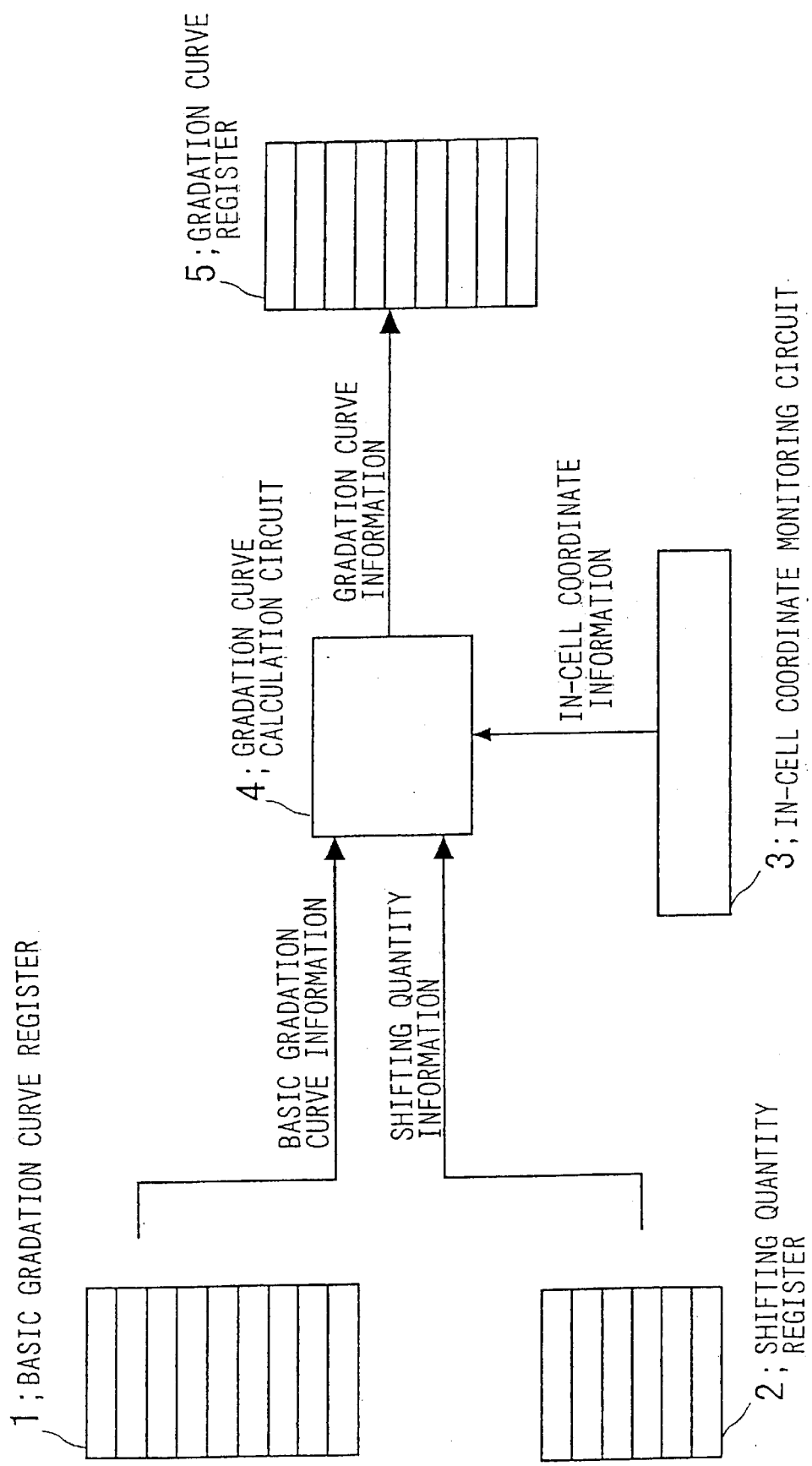
FIG. 2 is a block diagram showing a structure of the embodiment of the pi and the data flow.
Figure 3:
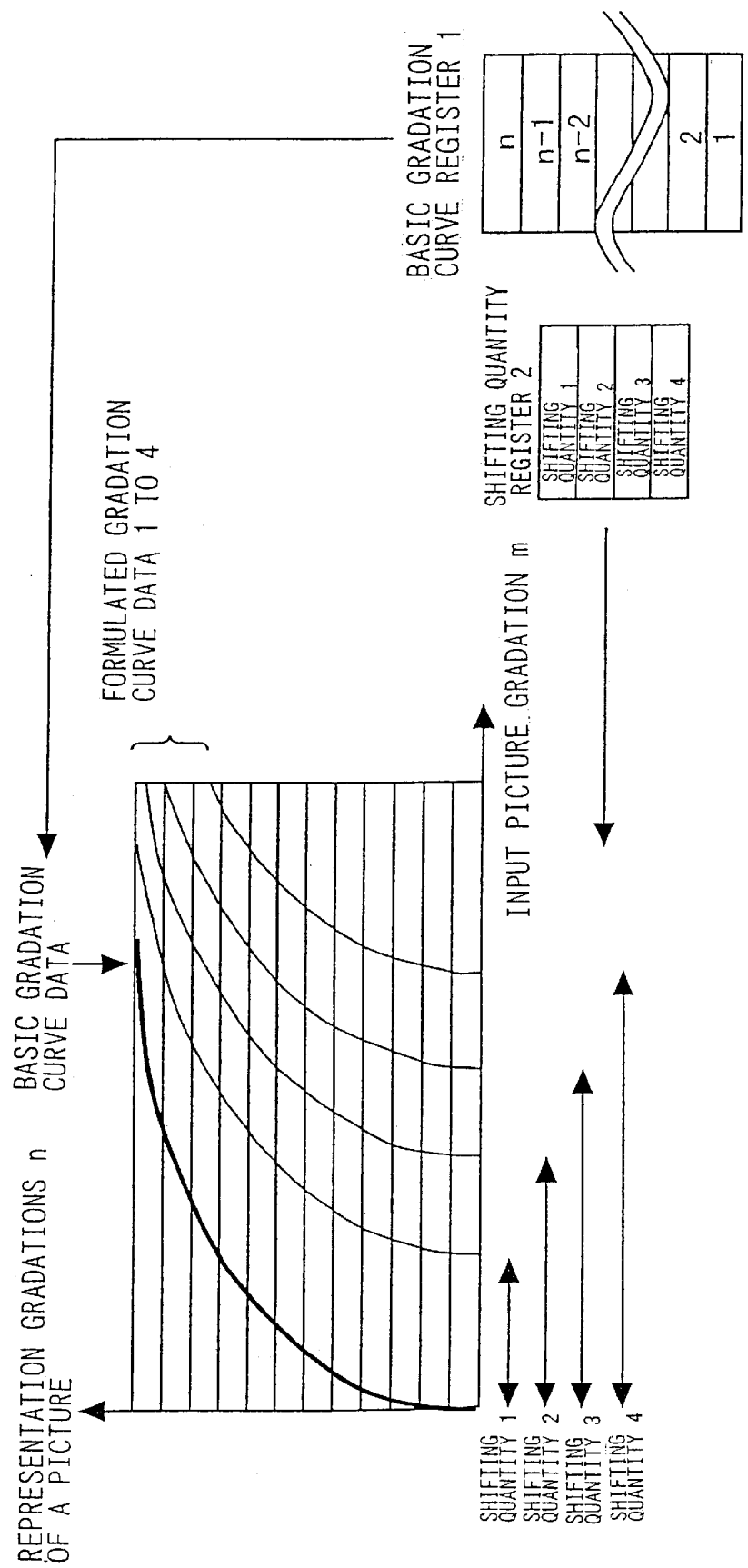
FIG. 3 illustrates an embodiment of the present invention and the manner of generation of the gradation curve information.

Referring to the accompanying drawings, a preferred embodiment of the present invention is explained. FIG. 1 illustrates the schematics of the processing steps of the halftone processing according to an embodiment of the present invention. FIGS. 2 and 3 illustrate the structure of an embodiment of the present invention and generation of the gradation curve information in this embodiment, respectively.

In the present embodiment, the invention is applied to a printing apparatus for color electronic photographs in which color picture data as multi-valued data are entered from a host computer and picture-processed to print and output a picture. The picture processing controller portion is constituted by a hardware.

Referring more specifically to FIG. 2, the picture processing controller includes an in-cell coordinate monitoring circuit 3 for monitoring the position in a half-tone cell of a dot whose gradation is to be converted, and a gradation curve register 5 for storing the gradation curve information required for gradation conversion of the input color picture. The picture processing controller also includes a calculation circuit 4 for generating the gradation curve information and a basic gradation curve register 1 and a shift quantity resister 2 for storing the basic gradation curve data and the shift quantity data to be accorded to the calculation circuit 4, respectively.

The color picture processing in the apparatus embodying the present invention exploits the half-tone cell concept and its processing uses a technique well-known in color picture processing. Therefore, the processing flow is shown only briefly in FIG. 1 and the explanation of a detailed structure thereof is omitted for simplicity.

The operation of the present embodiment is hereinafter explained.

When color picture data are transferred from an upper order apparatus, such as a host computer, to the printing apparatus, the input picture is split (divided) on gradation conversion processing to dot group units conceptually termed "half-tone cells" at step 1 of FIG. 1. In the half-tone cell, the coordinate of a targeted dot under consideration is monitored.

To the input color picture data is accorded, from the coordinate information in the half tone cell, the gradation curve information which will optimize the printed output picture from dot to dot (step 2 of FIG. 1).

For generating the gradation curve information, optimum values of the gradation curve information are set which will give a satisfactory printing output in each of the basic gradation curve register 1 and the shifting quantity resister 2 provided in the picture processing circuit of the present embodiment.

If color picture data is sent from the host computer to the inside of the printing apparatus, the basic gradation curve information from the basic gradation curve register 1 and the shifting quantity information from the shifting quantity resister 2 are selected in a gradation curve calculating circuit 4, based on the coordinate information (in-cell coordinate information) of a dot about to be processed with gradation conversion and which is sent from the in-cell coordinate monitoring circuit 3. The basic gradation curve information is shifted by certain shifting quantity to generate the gradation curve information which is stored in a gradation curve register 5.

The gradation conversion processing is carried out on the dot basis by having reference to the gradation curve register 5 (at step 3 of FIG. 1) and processed gradation data is transferred to an engine portion in the printing apparatus to carry out printing.

FIG. 3 shows typical curves representing the basic gradation curve information (basic gradation curve data) and the gradation curve information that can be generated by shifting (adding) the basic gradation curve data in accordance with the shifting information of the shifting quantity register 2 (gradation curve data 1 to 4 of the formulated gradation curves of FIG. 3).

As a modified embodiment of the present invention, the basic structure is described above. Since this embodiment is characterized in its color picture processing portion, similar effects can be obtained by similar structures if color picture processing is to be made not only in the printing apparatus for color electronic photographs but also in a color picture inputting/outputting apparatus, such as an ink jet or thermal transfer color printing apparatus or a color facsimile device.

In the above-described embodiment, there is provided only one basic gradation curve information data. However, there may possibly be instances wherein plural basic gradation curve information data are required for finding an optimum output picture. In such case, since there are one basic gradation curve information data and one sifting quantity data for a given dot, there necessarily exist basic gradation curve registers not in use. If, in this consideration, the shifting quantity information is suitably stored in the basic gradation curve registers not in use, there is no necessity of using shifting quantity registers, or the number of the registers may be reduced.

The present invention is not limited to the above embodiments and the above-described embodiment may be suitably modified within the scope conforming to the principle of the invention.

The meritorious effect of the present invention are summarized as follows.

According to the present invention, as described above, the number of registers for storing the gradation curve information can be reduced to provide an inexpensive color printing apparatus on the basis of a basic structure including means for finding the gradation curve from the basic gradation curve information And the shifting quantity information in a portion of a conventional color printing apparatus responsible for performing gradation change by hardware.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A printing apparatus for color electronic photographs having a function of inputting input gradation data of plural bits concerning representation of a dot, a function of comparing said input gradation data to a pre-formulated gradation table to effect gradation conversion, said apparatus comprising:

a set of registers for storing, as data, gradation curve information necessary for said gradation conversion which determines data desired to be output depending on values of said input gradation data;

a gradation curve calculating circuit which calculates the gradation curve information stored in said set of registers; and a basic gradation curve register and a shifting quantity register, said basic gradation curve register storing basic gradation curve data fed to said gradation curve calculating circuit, while said shifting quantity register stores shifting quantity data which is the quantity of shifting of said basic gradation curve data.

2. The printing apparatus as defined in claim 1, wherein said data desired to be output depending on values of input gradation data is data of laser intensity or radiation time.

3. The printing apparatus as defined in claim 1, wherein said calculation is based on addition of two systems of input data.

4. The printing apparatus as defined in claim 1, wherein said shifting quantity data is an addend to be used for said calculation to provide a parallel shifting of said basic gradation curve represented by said basic gradation curve data.

5. A picture processing apparatus for half-tone processing an input picture comprising:

a gradation curve calculation means for generating gradation curve information of reference by calculations;

a basic gradation curve storage unit which stores information on the basic gradation curve required for said calculations; and a shifting quantity storage unit which stores shifting quantity information for shifting calculations of the basic gradation curve by said gradation curve calculation means;

said gradation curve calculation means being fed with said basic gradation curve information, and said shifting quantity information for generating gradation curve information required for performing half-tone processing.

6. The picture processing apparatus as defined in claim 5 wherein the basic gradation curve information and the shifting quantity information from said basic gradation curve storage unit and said shifting quantity storage unit are selected in said gradation curve calculation means, based on the coordinate information of a dot about to be processed with gradation conversion processing, supplied from coordinate monitoring means in a half-tone cell, and wherein the basic gradation curve information is shifting-calculated depending on said shifting quantity to generate the basic gradation curve information to store the generated basic gradation curve information in a gradation curve storage unit.

7. The picture processing apparatus as defined in claim 5 wherein said gradation curve calculation means, under reference to the gradation curve information, process the input gradation curve based on gradation conversion processing to output the resulting data as output gradation data.

8. The picture processing apparatus as defined in claim 5 wherein the shifting quantity, information is stored in a vacant area of said basic gradation curve storage unit not storing the basic gradation curve.

9. A printing apparatus for color electronic photographs having a function of inputting input gradation data of plural bits concerning representation of a dot, a function of comparing said input gradation data to a pre-formulated gradation table to effect gradation conversion, said apparatus comprising:

a set of registers for storing, as data, gradation curve information necessary for said gradation conversion which determines data desired to be output depending on values of said input gradation data;

a gradation curve calculating circuit which calculates the gradation curve information stored in said set of registers;

a basic gradation curve register and a shifting quantity register, said basic gradation curve register storing basic gradation curve data fed to said gradation curve calculating circuit, while said shifting quantity register stores shifting quantity data which is the quantity of shifting of said basic gradation curve data; and wherein the basic gradation curve information and the shifting quantity information are selected in said gradation curve calculation means based on the coordinate information of a dot about to be processed with gradation conversion processing.

10. The printing apparatus according to claim 9, wherein said data desired to be output depending on values of input gradation data is data of laser intensity or radiation time.

11. The printing apparatus according to claim 9, wherein said calculation is based on the addition of two systems of input data.

12. The printing apparatus according to claim 9, wherein said shifting quantity data is an addend to be used for said calculation to provide a parallel shifting of said basic gradation curve represented by said basic gradation curve data.

13. A picture processing apparatus for half-tone processing an input picture comprising:

gradation curve calculation means for generating gradation curve information of reference by calculations;

a basic gradation curve storage unit which stores information on the basic gradation curve required for said calculations;

a shifting quantity storage unit which stores shifting quantity information for shifting calculations of the basic gradation curve by said gradation curve calculation means;

said gradation curve calculation means being fed with said basic gradation curve information, and said shifting quantity information for generating gradation curve information required for performing half-tone processing; and wherein the basic gradation curve information and the shifting quantity information are selected in said gradation curve calculation means based on the coordinate information of the dot about to be processed with the gradation conversion processing.

14. The picture processing apparatus according to claim 13, wherein said gradation curve calculation means, under reference to the gradation curve information, processes the input gradation curve based on gradation conversion processing to output the resulting data as output gradation data.

15. The picture processing apparatus according to claim 13, wherein the shifting quantity information is stored in a vacant area of said basic gradation curve storage unit not storing the basic gradation curve.

* * * * *